United States Patent
Mutz et al.

(10) Patent No.: US 7,090,333 B2
(45) Date of Patent: Aug. 15, 2006

(54) FOCUSED ACOUSTIC ENERGY IN THE PREPARATION OF PEPTIDE ARRAYS

(75) Inventors: Mitchell W. Mutz, Palo Alto, CA (US); Richard N. Ellson, Palo Alto, CA (US)

(73) Assignee: Picoliter Inc., Mountain View, CA (US)

( * ) Notice: Subject to any disclaimer, the term of this patent is extended or adjusted under 35 U.S.C. 154(b) by 459 days.

(21) Appl. No.: 10/271,940

(22) Filed: Oct. 15, 2002

(65) Prior Publication Data

US 2003/0059522 A1    Mar. 27, 2003

Related U.S. Application Data

(63) Continuation of application No. 09/963,173, filed on Sep. 25, 2001, which is a continuation-in-part of application No. 09/669,997, filed on Sep. 25, 2000, now abandoned.

(51) Int. Cl.
*B41J 2/135* (2006.01)
*C07K 2/00* (2006.01)

(52) U.S. Cl. ............... 347/46; 347/40; 514/2; 523/160; 422/100; 427/457

(58) Field of Classification Search ............ 514/2; 530/324, 345; 523/160; 422/100; 347/46; 427/457

See application file for complete search history.

(56) References Cited

U.S. PATENT DOCUMENTS

| | | | |
|---|---|---|---|
| 4,308,547 A | 12/1981 | Lovelady et al. | |
| 4,697,195 A | 9/1987 | Quate et al. | |
| 4,719,476 A | 1/1988 | Elrod et al. | |
| 4,751,529 A | 6/1988 | Elrod et al. | |
| 4,751,530 A | 6/1988 | Elrod et al. | |
| 4,751,534 A | 6/1988 | Elrod et al. | |
| 4,797,693 A | 1/1989 | Quate | |
| 4,801,953 A | 1/1989 | Quate | |
| 5,143,854 A | 9/1992 | Pirrung et al. | |
| 5,231,426 A | 7/1993 | Sweet | |
| 5,242,974 A | 9/1993 | Holmes | |
| 5,384,261 A | 1/1995 | Winkler et al. | |
| 5,405,783 A | 4/1995 | Pirrung et al. | |
| 5,412,087 A | 5/1995 | McGall et al. | |
| 5,415,679 A | 5/1995 | Wallace | |
| 5,436,327 A | 7/1995 | Southern et al. | |
| 5,445,934 A | 8/1995 | Fodor et al. | |
| 5,527,681 A | 6/1996 | Holmes | |
| 5,554,501 A | 9/1996 | Coassin et al. | |
| 5,565,113 A | 10/1996 | Hadimioglu et al. | |
| 5,591,490 A | 1/1997 | Quate | |
| 5,608,433 A | 3/1997 | Quate | |
| 5,705,693 A | 1/1998 | DePrince et al. | |
| 5,744,305 A | 4/1998 | Fodor et al. | |
| 5,747,554 A * | 5/1998 | Sacripante et al. | 523/161 |
| 5,770,456 A | 6/1998 | Holmes | |
| 5,858,804 A | 1/1999 | Zanzucchi et al. | |
| 5,885,837 A | 3/1999 | Winkler et al. | |
| 5,959,098 A | 9/1999 | Goldberg et al. | |
| 5,985,551 A | 11/1999 | Brennan | |
| 6,004,752 A | 12/1999 | Loewy et al. | |
| 6,015,880 A | 1/2000 | Baldeschwieler et al. | |
| 6,025,412 A * | 2/2000 | Sacripante et al. | 523/161 |
| 6,028,189 A | 2/2000 | Blanchard | |
| 6,029,896 A | 2/2000 | Self et al. | |
| 6,048,699 A | 4/2000 | Foley et al. | |
| 6,087,102 A | 7/2000 | Chenchik et al. | |
| 6,166,105 A * | 12/2000 | Santilli et al. | 523/160 |
| 2002/0037375 A1 | 3/2002 | Ellson et al. | |
| 2002/0037527 A1 | 3/2002 | Ellson et al. | |
| 2002/0037579 A1 | 3/2002 | Ellson et al. | |

FOREIGN PATENT DOCUMENTS

| | | |
|---|---|---|
| WO | WO 95/35505 | 12/1995 |
| WO | WO 99/35289 | 7/1999 |
| WO | WO 00/06770 | 2/2000 |
| WO | WO 00/27521 | 5/2000 |

OTHER PUBLICATIONS

MacBeath et al. (2000), "Printing Proteins as Microarrays for High-Throughput Function Determination," *Science* 289:1760-1763.

* cited by examiner

*Primary Examiner*—David Lukton
(74) *Attorney, Agent, or Firm*—Dianne E. Reed; Karen Canaan; Mintz, Levin, Cohn, Ferris, Glovsky and Popeo, P.C.

(57) ABSTRACT

The present invention relates to arrays of peptidic molecules and the preparation of peptide arrays using focused acoustic energy. The arrays are prepared by acoustically ejecting peptide-containing fluid droplets from individual reservoirs towards designated sites on a substrate for attachment thereto.

35 Claims, 1 Drawing Sheet

FOCUSED ACOUSTIC ENERGY IN THE PREPARATION OF PEPTIDE ARRAYS

CROSS-REFERENCE TO RELATED APPLICATIONS

This is a continuation of U.S. patent application Ser. No. 09/963,173, filed Sep. 25, 2001, which is a continuation-in-part of U.S. patent application Ser. No. 09/669,997, filed Sep. 25, 2000 now abandoned, the disclosure of which is incorporated by reference herein.

TECHNICAL FIELD

This invention relates generally to arrays of peptidic molecules and methods for preparing peptide arrays. More particularly, the invention pertains to the use of focused acoustic ejection (FAE) technology in the preparation of peptide arrays.

BACKGROUND

The potential advantages of peptide arrays, i.e., arrays composed of a plurality of peptidic molecules, are appreciated by researchers, scientists and clinicians. Peptide arrays enable high-throughput screening of compounds that may interact with one or more peptides in the array in a particular manner. For example, an array of peptidic molecules potentially suitable as ligands for a particular biological receptor may be prepared and "screened" with respect to that receptor. Also, arrays of antibodies may be used to screen for multiple pathogenic antigens in a patient sample. Combinations of proteins may also be used to screen for molecules, which interact or are part of a similar metabolic pathway. In addition, peptide arrays can be employed by clinicians to determine whether or not a patient has developed antibodies to particular peptidic antigens. The promise of peptidic arrays, however, has been not been fully realized. This is in large part due to manufacturing challenges, but other problems have been encountered as well.

One proposed method for manufacturing peptide arrays involves the use of piezoelectric technology, in particular, inkjet printing technology. For example, U.S. Pat. No. 6,015,880 to Baldeschwieler et al. is directed to array preparation and in situ oligomer synthesis using a multistep process, wherein the oligomers synthesized may be oligopeptides. A microdrop of a first reagent in liquid form is applied through a single jet of a multiple jet reagent dispenser to a locus on a surface chemically prepared to react with and covalently attach the reagent. The multiple jet reagent dispenser is then displaced relative to the surface, or the surface is displaced with respect to the dispenser, and at least one microdrop containing either the first reagent or a second reagent from a different dispenser jet is applied to a second locus on the substrate, which, again, is chemically prepared to react with and covalently bind the second reagent. Optionally, the second step is repeated using either the first or second reagents, or different reagents in liquid form from different dispenser jets, wherein the process results in an oligomer, such as an oligopeptide, covalently attached to the substrate surface.

Ordinary inkjet technology, however, suffers from a number of drawbacks. Often, inkjet technology involves heating or using a piezoelectric element to force a fluid through a nozzle in order to direct the ejected fluid onto a surface. Thus, the fluid may be exposed to a surface exceeding 200° C. before being ejected, and most, if not all, peptidic molecules, including proteins, degrade under such extreme temperatures. In addition, forcing peptidic molecules through nozzles creates shear forces that can alter molecular structure. Nozzles are subject to clogging, especially when used to eject a macromolecule-containing fluid, and the use of elevated temperatures exacerbates the problem because liquid evaporation results in deposition of precipitated solids on the nozzles. Clogged nozzles, in turn, can result in misdirected fluid or ejection of improperly sized droplets. Finally, ordinary inkjet technology employing a nozzle for fluid ejection generally cannot be used to deposit arrays with feature densities comparable to those obtainable using photolithography or other techniques commonly used in semiconductor processing.

Photolithographic techniques have also been proposed for use in the manufacture peptidic arrays. For example, U.S. Pat. Nos. 5,143,854 and 5,405,783 to Pirrung et al., and U.S. Pat. Nos. 5,445,934 and 5,744,305 to Fodor et al. describe solid phase synthesis of oligomers, including peptidic oligomers, employing photolithographic techniques. These techniques, however, require a large number of masking steps, resulting in a relatively low overall yield, and are prohibitively expensive. In addition, photolithographic techniques often leave behind small amounts of photolithographic processing materials, e.g., photolabile groups. Furthermore, the purity of the peptidic molecules within the array is relatively low, given that truncated proteins result from missed steps (e.g., failure of a photolabile group to be removed), and imprecise masking placement results in misplaced material.

Both approaches inkjet and photolithographic processes generally rely on in situ preparation of the peptidic molecules. These techniques are generally unsuitable for producing high density arrays of even moderately sized peptidic molecules. For example, in situ synthesis of peptides using photolithographic techniques could require over 100 masks for a peptide only six amino acids in length. Furthermore, there is no guarantee that proteins synthesized in situ will adopt the secondary and tertiary structure necessary for biological activity.

A number of patents have described the use of acoustic energy in printing. For example, U.S. Pat. No. 4,308,547 to Lovelady et al. describes a liquid drop emitter that utilizes acoustic principles in ejecting droplets from a body of liquid onto a moving document to form characters or bar codes thereon. A nozzleless inkjet printing apparatus is used wherein controlled drops of ink are propelled by an acoustical force produced by a curved transducer at or below the surface of the ink. In contrast to inkjet printing devices, nozzleless fluid ejection devices described in the aforementioned patent are not subject to clogging and the disadvantages associated therewith, e.g., misdirected fluid or improperly sized droplets.

The applicability of nozzleless fluid ejection has generally been appreciated for ink printing applications. Development of ink printing applications is primarily economically driven by printing cost and speed for acceptable text. For acoustic printing, development efforts have therefore focused on reducing printing costs rather than improving quality, and on increasing printing speed rather than accuracy. For example, U.S. Pat. No. 5,087,931 to Rawson is directed to a system for transporting ink under constant flow to an acoustic ink printer having a plurality of ejectors aligned along an axis, each ejector associated with a free surface of liquid ink. When a plurality of ejectors is used instead of a single ejector, printing speed generally increases, but controlling fluid ejection, specifically droplet placement, becomes more difficult.

U.S. Pat. No. 4,797,693 to Quate describes an acoustic ink printer for printing polychromatic images on a recording medium. The printer is described as comprising a combination of a carrier containing a plurality of differently colored liquid inks, a single acoustic printhead acoustically coupled to the carrier for launching converging acoustic waves into the carrier, an ink transport means to position the carrier to sequentially align the differently colored inks with the printhead, and a controller to modulate the radiation pressure used to eject ink droplets. This printer is described as designed for the realization of cost savings. Because two droplets of primary color, e.g., cyan and yellow, deposited in sufficient proximity will appear as a composite or secondary color, the level of accuracy required is fairly low and inadequate for biomolecular array formation. Such a printer is particularly unsuitable for in situ synthesis requiring precise droplet deposition and consistent placement, so that the proper chemical reactions occur. That is, the drop placement accuracy needed to effect perception of a composite secondary color is much lower than is required for chemical synthesis at photolithographic density levels. Consequently, an acoustic printing device that is suitable for printing visually apprehensible material is inadequate for microarray preparation. Also, this device can eject only a limited quantity of ink from the carrier before the liquid meniscus moves out of acoustic focus and drop ejection ceases. This is a significant limitation with biological fluids, which are typically far more costly and rare than ink. The Quate et al. patent does not address how to use most of the fluid in a closed reservoir without adding additional liquid from an external source.

Thus, there is a need in the art for improved acoustic fluid ejection methods having sufficient droplet ejection accuracy so as to enable the preparation of high density peptidic arrays without the disadvantages associated with photolithographic techniques or inkjet printing devices relying on a nozzle or relatively large volumes of materials for droplet ejection. Specifically, acoustic fluid ejection devices as described herein provide improved control over the spatial direction of fluid ejection without the disadvantages of lack of flexibility and uniformity associated with photolithographic techniques or inkjet printing devices.

SUMMARY OF THE INVENTION

Accordingly, it is an object of the present invention to provide a method for preparing a peptide array that is not subject to the above-mentioned disadvantages of the prior art.

It is another object of the invention to provide a method for preparing a peptide array by applying focused acoustic energy to fluid-containing reservoirs, wherein each reservoir contains a peptidic molecule.

It is still another object of the invention to provide a method for preparing peptide arrays wherein the method is minimally or completely unaffected by the use of relatively viscous fluids containing peptidic molecules.

It is yet another object of the invention to provide a method for preparing peptide arrays wherein the method does not result in or minimizes the exposure of peptidic molecules to shear stress or high temperature.

It is a further object of the invention to provide peptide arrays prepared using the aforementioned method.

It is another object of the invention to provide peptide arrays wherein substantially none of the peptidic molecules exhibits signs of shear stress and all peptidic molecules are "pure," i.e., intact and identical to the peptidic molecules in the fluids from which they are ejected.

It is still another object of the invention to provide peptide arrays wherein substantially none of the peptidic molecules exhibits signs of shear stress and at least one designated site on the substrate surface includes a lipidic material.

Additional objects, advantages and novel features of the invention will be set forth in part in the description which follows, and in part will become apparent to those skilled in the art upon examination of the following, or may be learned by practice of the invention.

In one aspect of the invention, a method is provided for preparing a peptide array comprised of a plurality of peptidic molecules each attached to a designated site on a substrate surface. The method comprises applying focused acoustic energy to each of a plurality of fluid-containing reservoirs containing a peptidic molecule to be applied to a particular site on the substrate surface and attached thereto. It is preferred that the focused acoustic energy is applied to each of the plurality of fluid-containing reservoirs by acoustically coupling each reservoir in succession to a single ejector that produces acoustic radiation. Following each acoustic coupling step, the ejector is activated to generate acoustic radiation having a focal point within the reservoir fluid and sufficiently near the surface thereof such that a droplet of fluid is ejected from the reservoir toward a particular site on the substrate surface.

In another aspect of the invention, a peptide array is provided comprised of a plurality of peptidic molecules attached to a substrate surface through an optional linking moiety. Substantially none of the peptidic molecules of the peptide array exhibits signs of shear stress. Further, substantially all of the peptide molecules are intact and attached to a predetermined site on the substrate surface, and/or at least one designated site on the substrate surface includes a lipidic material. In addition, the peptide array is preferably substantially free of photolithographic processing materials.

The present focused acoustic ejection methodology enables preparation of high-density peptidic arrays comprised of at least 62,500 peptidic molecules (i.e., array elements) per square centimeter of substrate surface, preferably at least 250,000, more preferably at least 1,000,000, and most preferably at least 1,500,000 peptidic molecules per square centimeter of substrate surface.

Although any mode of attachment may be used, covalent attachment of the peptidic molecules to the substrate surface is preferred in most instances. Alternatively, attachment of the peptidic molecules to the substrate surface may be noncovalent; for example, the peptidic molecules can be adsorbed onto the substrate surface or physically immobilized thereon. The substrate surface can be comprised of any suitable material that allows for attachment of peptidic molecules; however, substrate surfaces comprised of a porous material are preferred.

BRIEF DESCRIPTION OF THE DRAWINGS

FIG. 1 shows the acoustic ejector acoustically coupled to the first reservoir and having been activated in order to eject a droplet of fluid from within the first reservoir toward a designated site on a substrate surface. FIG. 2 shows the acoustic ejector acoustically coupled to a second reservoir.

DETAILED DESCRIPTION OF THE INVENTION

Figure 1:
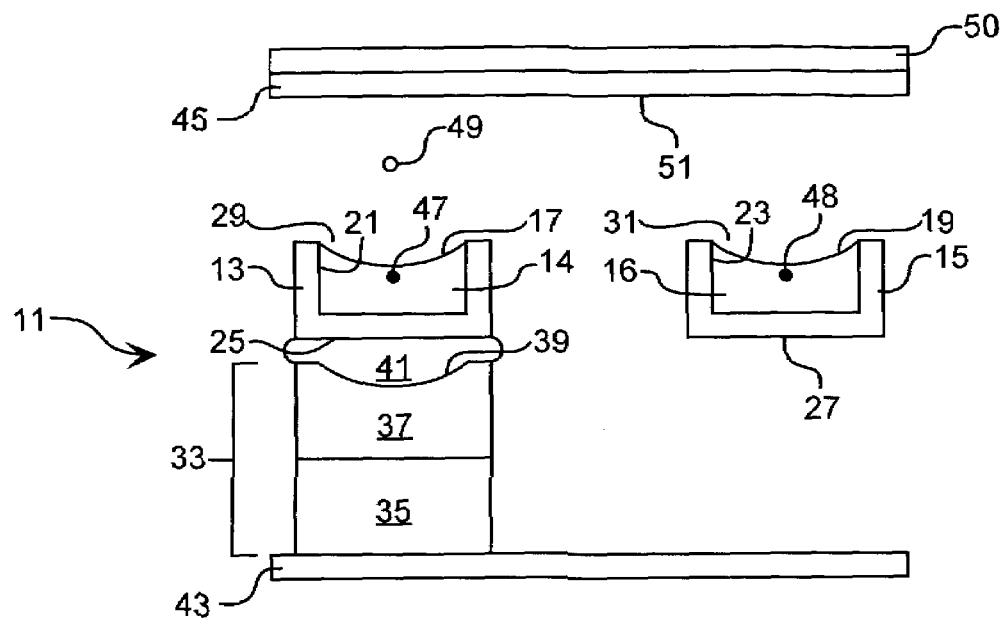
FIGS. 1 and 2 schematically illustrate in simplified cross-sectional view an embodiment of a device useful in conjunction with the method of the invention, the device comprising first and second reservoirs, an acoustic ejector, and an ejector positioning means.

Before describing the present invention in detail, it is to be understood that this invention is not limited to specific fluids, peptidic molecules or device structures, as such may vary. It is also to be understood that the terminology used herein is for the purpose of describing particular embodiments only, and is not intended to be limiting.

It must be noted that, as used in this specification and the appended claims, the singular forms "a," "an" and "the" include plural referents unless the context clearly dictates otherwise. Thus, for example, reference to "a reservoir" includes not only a single reservoir but also a plurality of reservoirs, reference to "a peptidic molecule" includes a single peptidic molecule as well as a combination of different peptidic molecules, and the like.

In describing and claiming the present invention, the following terminology will be used in accordance with the definitions set out below.

The terms "acoustic coupling" and "acoustically coupled" used herein refer to a state wherein a first entity is placed in direct or indirect contact with another entity so as to allow acoustic radiation to be transferred between the objects without substantial loss of acoustic energy. When two entities are indirectly acoustically coupled, an "acoustic coupling medium" is needed to provide an intermediary through which acoustic radiation may be transmitted. Thus, an ejector may be acoustically coupled to a fluid, e.g., by immersing the ejector in the fluid or by interposing an acoustic coupling medium between the ejector and the fluid to transfer acoustic radiation generated by the ejector through the acoustic coupling medium and into the fluid.

The term "adsorb" as used herein refers to the noncovalent retention of a molecule by a substrate surface. That is, adsorption occurs as a result of noncovalent interaction between a substrate surface and adsorbing moieties present on the molecule that is adsorbed. Adsorption may occur through hydrogen bonding, van der Waal's forces, polar attraction or electrostatic forces (i.e., through ionic bonding). Examples of adsorbing moieties include, but are not limited to, amine groups, carboxylic acid moieties, antibodies, hydroxyl groups, nitroso groups, sulfones and the like. Often the substrate may be functionalized with adsorbent moieties to interact in a certain manner, as when the surface is functionalized with amino groups to render it positively charged in a pH neutral aqueous environment. Likewise, adsorbate moieties may be added in some cases to effect adsorption, as when a basic protein is fused with an acidic peptide sequence to create adsorbate moieties that can interact electrostatically with a positively charged adsorbent moiety.

The term "array" as used herein refers to a two-dimensional arrangement of features on a substrate surface. In the present arrays, the "features" are peptidic molecules. Arrays are generally comprised of regular, ordered features, as in, for example, a rectilinear grid, parallel stripes, spirals, and the like, but non-ordered arrays may be advantageously used as well. The arrays prepared using the method of the invention generally comprise in the range of about 4 to about 10,000,000 features, more typically about 4 to about 1,000,000 features.

The term "attached," as in, for example, a substrate surface having a peptidic molecule "attached" thereto, includes covalent binding, adsorption, and physical immobilization. The terms "binding" and "bound" are identical in meaning to the term "attached."

The term "peptidic molecule" as used throughout the specification and claims is intended to include any structure comprised of one or more amino acids. Generally, since the peptidic molecules are typically pre-formed and spotted onto the substrate as intact molecules, they are comprised of two or more amino acids, and are peptides, polypeptides or proteins. Normally, amino acids will serve as the peptidic molecules only when the peptide array is prepared via stepwise in situ synthesis on the solid support. For the most part, then, the peptidic molecules in the present arrays comprise about 5 to 10,000 amino acids, preferably about 5 to 1000 amino acids. The amino acids forming all or a part of a peptidic molecule may be any of the twenty conventional, naturally occurring amino acids, i.e., alanine (A), cysteine (C), aspartic acid (D), glutamic acid (E), phenylalanine (F), glycine (G), histidine (H), isoleucine (I), lysine (K), leucine (L), methionine (M), asparagine (N), proline (P), glutamine (Q), arginine (R), serine (S), threonine (T), valine (V), tryptophan (W), and tyrosine (Y). Any of the amino acids in the peptidic molecules forming the present arrays may be replaced by a non-conventional amino acid. In general, conservative replacements are preferred. Conservative replacements substitute the original amino acid with a non-conventional amino acid that resembles the original in one or more of its characteristic properties (e.g., charge, hydrophobicity, stearic bulk; for example, one may replace Val with Nval). The term "non-conventional amino acid" refers to amino acids other than conventional amino acids, and include, for example, isomers and modifications of the conventional amino acids, e.g., D-amino acids, non-protein amino acids, post-translationally modified amino acids, enzymatically modified amino acids, constructs or structures designed to mimic amino acids (e.g., α,α-disubstituted amino acids, N-alkyl amino acids, lactic acid, β-alanine, naphthylalanine, 3-pyridylalanine, 4-hydroxyproline, O-phosphoserine, N-acetylserine, N-formylmethionine, 3-methylhistidine, 5-hydroxylysine, and nor-leucine), and other non-conventional amino acids, as described, for example, in U.S. Pat. No. 5,679,782 to Rosenberg et al. The peptidic molecules may also contain nonpeptidic backbone linkages, wherein the naturally occurring amide —CONH— linkage is replaced at one or more sites within the peptide backbone with a non-conventional linkage such as N-substituted amide, ester, thioamide, retropeptide (—NHCO—), retrothioamide (—NHCS—), sulfonamido (—SO$_2$NH—), and/or peptoid (N-substituted glycine) linkages. Accordingly, the peptidic molecules of the array include pseudopeptides and peptidomimetics. The peptides of this invention can be (a) naturally occurring, (b) produced by chemical synthesis, (c) produced by recombinant DNA technology, (d) produced by biochemical or enzymatic fragmentation of larger molecules, (e) produced by methods resulting from a combination of methods (a) through (d) listed above, or (f) produced by any other means for producing peptides.

As will be appreciated by those skilled in the art, peptidic molecules have certain levels of structure. The primary structure of a peptidic molecule is generally the amino acid sequence per se, while the secondary structure of a peptidic molecule refers to the regular, local structures of linear segments of polypeptide chains, such as a helix, an extended strand, or a β-pleated sheet. The tertiary structure of a peptide refers to the overall topology of the molecule, resulting from, for example, folding within a polypeptide chain. See Creighton, *Proteins: Structures and Molecular Properties*, 2nd Edition (W. H. Freeman and Company, New York, 1993). Although each structural level is critical for the properties and biological activity of a peptidic molecule, the secondary and tertiary structures are particularly sensitive to shearing forces. When exposed to shear, a peptidic molecule's secondary and/or tertiary structure can be irreversibly altered, potentially resulting in loss of biological activity. Of course, the primary structure, i.e., the amino acid sequence, may be destroyed or interrupted if the peptidic molecule is subjected to sufficient shear force.

The term "fluid" as used herein refers to matter that is nonsolid or at least partially gaseous and/or liquid. A fluid may contain a solid that is minimally, partially or fully solvated, dispersed or suspended. Examples of fluids include, without limitation, aqueous liquids (including water per se and buffered water), nonaqueous liquids such as organic solvents and lipidic liquids, supercritical fluids, gases, and the like. As used herein, the term "fluid" is not synonymous with the term "ink" in that an ink must contain a colorant and may not be gaseous.

The term "near" is used to refer to the distance from the focal point of the focused acoustic radiation to the surface of the fluid from which a droplet is to be ejected. The distance should be such that the focused acoustic radiation directed into the fluid results in droplet ejection from the fluid surface, and one of ordinary skill in the art will be able to select an appropriate distance for any given fluid using straightforward and routine experimentation. Generally, however, a suitable distance between the focal point of the acoustic radiation and the fluid surface is in the range of about 1 to about 15 times the wavelength of the speed of sound in the fluid, more typically in the range of about 1 to about 10 times that wavelength, preferably in the range of about 1 to about 5 times that wavelength.

The terms "focusing means" and "acoustic focusing means" refer to a means for causing acoustic waves to converge at a focal point by either a device separate from the acoustic energy source that acts like an optical lens, or by the spatial arrangement of acoustic energy sources to effect convergence of acoustic energy at a focal point by constructive and destructive interference. A focusing means may be as simple as a solid member having a curved surface, or it may include complex structures such as those found in Fresnel lenses, which employ diffraction in order to direct acoustic radiation. Suitable focusing means also include phased array methods as known in the art and described, for example, in U.S. Pat. No. 5,798,779 to Nakayasu et al. and Amemiya et al. (1997) *Proceedings of the 1997 IS&T NIP13 International Conference on Digital Printing Technologies Proceedings*, at pp. 698–702.

The term "reservoir" as used herein refers to a receptacle or chamber for holding or containing a fluid. Thus, a fluid in a reservoir necessarily has a free surface, i.e., a surface that allows a droplet to be ejected therefrom. A reservoir may also be a locus on a substrate surface within which a fluid is constrained.

The term "substrate" as used herein refers to any material having a surface onto which one or more fluids may be deposited. The substrate may be constructed in any of a number of forms such as wafers, slides, well plates, membranes, for example. In addition, the substrate may be porous or nonporous as may be required for deposition of a particular fluid. Suitable substrate materials include, but are not limited to, supports that are typically used for solid phase chemical synthesis, e.g., polymeric materials (e.g., polystyrene, polyvinyl acetate, polyvinyl chloride, polyvinyl pyrrolidone, polyacrylonitrile, polyacrylamide, polymethyl methacrylate, polytetrafluoroethylene, polyethylene, polypropylene, polyvinylidene fluoride, polycarbonate, divinylbenzene styrene-based polymers), agarose (e.g., Sepharose®), dextran (e.g., Sephadex®), cellulosic polymers and other polysaccharides, silica and silica-based materials, glass (particularly controlled pore glass, or "CPG") and functionalized glasses, ceramics, and such substrates treated with surface coatings, e.g., with microporous polymers (particularly cellulosic polymers such as nitrocellulose), microporous metallic compounds (particularly microporous aluminum), antibody-binding proteins (available from Pierce Chemical Co., Rockford Ill., bisphenol A polycarbonate, or the like.

Substrates of particular interest are porous, and include, as alluded to above: uncoated porous glass slides, including CPG slides; porous glass slides coated with a polymeric coating, e.g., an aminosilane or poly-L-lysine coating, thus having a porous polymeric surface; and nonporous glass slides coated with a porous coating. The porous coating may be a porous polymer coating, such as may be comprised of a cellulosic polymer (e.g., nitrocellulose) or polyacrylamide, or a porous metallic coating (for example, comprised of microporous aluminum). Examples of commercially available substrates having porous surfaces include the Fluorescent Array Surface Technology (FAST™) slides available from Schleicher & Schuell, Inc. (Keene, N.H.), which are coated with a 10–30 μm thick porous, fluid-permeable nitrocellulose layer that substantially increases the available binding area per unit area of surface. Other commercially available porous substrates include the CREATIVECHIP® permeable slides currently available from Eppendorf AG (Hamburg, Germany), and substrates having "three-dimensional" geometry, by virtue of an ordered, highly porous structure that enables reagents to flow into and penetrate through the pores and channels of the entire structure. Such substrates are available from Gene Logic, Inc. under the tradename "Flow-Thru Chip," and are described by Steel et al. in Chapter 5 of *Microarray Biochip Technology* (Bio-Techniques Books, Natick, Mass., 2000).

The term "porous" as in a "porous substrate" or a "substrate having a porous surface," refers to a substrate or surface, respectively, having a porosity (void percentage) in the range of about 1% to about 99%, preferably about 5% to about 99%, more preferably in the range of about 15% to about 95%, and an average pore size of about 100 Å to about 1 mm, typically about 500 Å to about 0.5 mm.

The term "impermeable" is used in the conventional sense to mean not permitting water or other fluid to pass through. The term "permeable" as used herein means not "impermeable." Thus, a "permeable substrate" and a "substrate having a permeable surface" refer to a substrate or surface, respectively, which can be permeated with water or other fluid.

While the foregoing support materials are representative of conventionally used substrates, it is to be understood that a substrate may in fact comprise any biological, nonbiological, organic and/or inorganic material, and may be in any of a variety of physical forms, e.g., particles, strands, precipitates, gels, sheets, tubing, spheres, containers, capillaries, pads, slices, films, plates, and the like, and may further have any desired shape, such as a disc, square, sphere, circle, etc. The substrate surface may or may not be flat, e.g., the surface may contain raised or depressed regions. A substrate may additionally contain or be derivatized to contain reactive functionalities that covalently link a compound to the substrate surface. These are widely known and include, for example, silicon dioxide supports containing reactive Si—OH groups, polyacrylamide supports, polystyrene supports, polyethylene glycol supports, and the like.

The term "surface modification" as used herein refers to the chemical and/or physical alteration of a surface by an additive or subtractive process to change one or more chemical and/or physical properties of a substrate surface or a selected site or region of a substrate surface. For example, surface modification may involve (1) changing the wetting properties of a surface, (2) functionalizing a surface, i.e., providing, modifying or substituting surface functional groups, (3) defunctionalizing a surface, i.e., removing surface functional groups, (4) otherwise altering the chemical composition of a surface, e.g., through etching, (5) increasing or decreasing surface roughness, (6) providing a coating on a surface, e.g., a coating that exhibits wetting properties that are different from the wetting properties of the surface, and/or (7) depositing particulates on a surface. Also included are those surface modifications that help preserve the structure (e.g., tertiary structure) of a protein by, for example, surface application of a lipidic material such as a phospholipid.

"Optional" or "optionally" means that the subsequently described circumstance may or may not occur, so that the description includes instances where the circumstance occurs and instances where it does not.

The term "substantially" as in, for example, the phrase "substantially all molecules of an array," refers to at least 90%, preferably at least 95%, more preferably at least 99%, and most preferably at least 99.9%, of the molecules of an array. Other uses of the term "substantially" involve an analogous definition.

In one embodiment, the invention pertains to a method for preparing a peptide array on a substrate surface, the method comprising applying focused acoustic energy to each of a plurality of fluid-containing reservoirs wherein each of the reservoirs contains a peptidic molecule in a fluid to be applied to a designated site on the substrate surface and attached thereto. The acoustic ejection device used to effect droplet ejection includes (a) an ejector comprised of an acoustic radiation generator for generating acoustic radiation and a focusing means for focusing acoustic radiation at a focal point within and near the fluid surface in each of the reservoirs, and (b) a means for positioning the ejector in acoustic coupling relationship to each of the reservoirs. Preferably, the device is coupled to each of the plurality of fluid-containing reservoirs in succession and activated to eject a droplet from each reservoir.

Initially, a first fluid-containing reservoir containing a first peptidic molecule is acoustically coupled to the acoustic ejector. Thereafter, the ejector is activated to generate acoustic radiation having a focal point sufficiently near the surface of the reservoir fluid so as to result in ejection of a fluid droplet from the reservoir toward a designated site on the substrate surface. Next, a second fluid-containing reservoir containing a second peptidic molecule is acoustically coupled to the ejector. Again, the ejector is activated to eject a droplet of fluid from the second reservoir toward a second designated site on the substrate surface. The process is repeated until a droplet has been ejected from each of the plurality of reservoirs. Typically, the droplets each have a volume of about 1 picoliter or less (e.g., 0.02 to 1 pL), enabling spotting at very high densities. In some cases, of course, spotting droplets of substantially greater volume may be desirable.

Once ejected, each peptidic molecule attaches to a particular location on the substrate surface. Attachment may be covalent or noncovalent, e.g., via ionic bonding, hydrogen bonding, adsorption or physical immobilization, and may or may not involve a linker between the peptidic molecule and the substrate surface. For example, the carboxyl terminus of a peptide may bind to a free amino group on an amine-derivatized substrate surface, resulting in an amide linkage. Conversely, primary amine groups in the peptidic moiety may be attached covalently to a surface via a succinimidyl ester group. As another example, an antibody (available commercially or using standard techniques of antibody production) may be bound to a peptidic molecule to provide a linker that can attach to a substrate surface functionalized with an antibody-binding protein, e.g., protein A that binds to the Fc portion of IgG and/or IgM antibodies, or protein L that binds to all classes of antibodies, e.g., immunoglobulins that contain kappa light chains. Biotin-streptavidin attachments are also contemplated.

A linker, if present, should have a length sufficient to allow another molecular entity (e.g., a potential ligand) to bind to the peptidic molecule. The linker may contain a cleavable site to allow release of the peptidic molecule from the substrate surface after use, e.g., after completion of a binding or screening assay. Selectably cleavable sites may be enzymatically, chemically, thermally or photolytically cleavable, as described in U.S. Pat. Nos. 4,775,619, 5,118,605, 5,258,506, 5,367,066, 5,380,833, 5,580,731 and 5,591,584. As explained in the aforementioned patents, a number of reagents and methods may be used to create sites that are cleavable using chemical reagents, restriction enzymes or photolysis.

As will be appreciated by those in the art, some substrate surfaces may require activation treatment in order to facilitate coupling of the peptidic molecule. Any art-known treatment may be employed. Examples of preferred treatment methods for activating substrate surfaces include treatment with an activating agent such as cyanogen bromide, tresyl chloride or N-hydroxysuccinimide. Other methods for activating substrate surfaces may also be employed.

As will be recognized by those skilled in the art, fluids that contain peptidic molecules may be somewhat viscous. Advantageously, the present method neither requires nozzles nor includes parts that may become clogged with relatively viscous fluids. Thus, the invention enables acoustical ejection of a plurality of fluids, wherein at least one fluid has a viscosity of least about 40 centipoise (cP). In addition, the method remains effective even when at least one of the fluids has a viscosity as high as 100 cP, and even 1000 cP (absolute viscosity).

It is preferred that the three-dimensional structure, i.e., the secondary and tertiary structure, of the peptidic molecule is preserved in the fluid. Preferred fluids for preserving peptidic structure comprise a solvent and a reagent capable of maintaining the pH. Additional components, such as a stabilizer (e.g., bovine serum albumin), may also be present in the fluid, if necessary. Suitable solvents for protein-containing fluids are well known in the art and typically comprise water as a solvent and an acid-base conjugate pair to maintain pH. Organic solvents may also be employed. Suitable reagents capable of maintaining pH include, for example, N-2-acetamido-2-aminoethane-sulfonic acid (ACES), ammonium acetate, N,N-bis-(2-hydroxyethyl)-glycine, N,N-bis-(2-hydroxyethyl)-2-aminoethanesulfonic acid (BES), [bis]-(2-hydroxyethyl)-imino]-tris-(hydroxymethyl)-methane (BIS-Tris), 1,3-bis-[tris-(hydroxymethyl)-methylamino]-propane (BIS-Tris-propane), 3-(cyclohexylamino)-propane-sulfonic acid (CAPS), 2-(N-cyclohexylamino) ethane-sulfonic acid) (CHES), glycine, glycine amide, 2-(N- morpholino)ethanesulfonic acid (MES), 3-(N-morpholino) ethanesulfonic acid (MOPS), piperazine-N,N'-bis-)2-ethane-sulfonic acid (PIPES), (N-[2-hydroxyethyl]-piperazine-N'-[2-ethanesulfonic acid]) (HEPES), 3-{[tris-(hydroxymethyl)-methyl]amino}-propanesulfonic acid (TAPS), 2-{[tris-(hydroxymethyl)-methyl]-amino}-ethane-sulfonic acid (TES), N-{tris-(hydroxy-methyl-methyl]-gly-cine}(Tricine), triethanolamine, tris-(hydroxymethyl)-aminomethane (TRIS), boric acid, cacodylic acid, potassium phosphate, sodium acetate, sodium citrate, sodium phosphate and combinations thereof. Solutions of a solvent and/or stabilizer can also be employed as part of a pretreatment of the surface or applied after deposition of the peptidic molecule in order to preserve the structure of the peptidic molecule.

In another embodiment, a peptide array is provided that is comprised of a plurality of peptidic molecules each attached through an optional linking moiety to a substrate surface, wherein substantially none of the peptidic molecules exhibits signs of shear stress and substantially all of the peptidic molecules are pure, i.e., intact, and attached to a predetermined site on the substrate surface. In an alternative embodiment, a peptide array is provided that is comprised of a plurality of peptidic molecules each attached through an optional linking moiety to a substrate surface, wherein substantially none of the peptidic molecules exhibits signs of shear stress and at least one designated site on the substrate includes a lipidic material. The peptide array may be a combinatorial library of peptidic molecules, i.e., an array wherein each peptidic molecule is different from every other peptidic molecule.

Peptidic compounds include any pharmacologically active peptide, polypeptide or protein, such as, but not limited to enzymes, monoclonal and polyclonal antibodies, antigens, coagulation modulators, cytokines, endorphins, peptidyl hormones, kinins, and structurally similar bioactive equivalents thereof. By a "structurally similar bioactive equivalent" is meant a peptidyl compound with structure sufficiently similar to that of an identified bioactive peptidyl compound to produce substantially equivalent therapeutic effects. As used herein and in the appended claims, the terms "protein", "peptide" and "polypeptide" refer to both the specific peptidic compound(s) identified as well as structurally similar bioactive equivalents thereof.

Examples of various peptidyl compounds are as follows:

Coagulation modulators include $\alpha_1$-antitrypsin, $\alpha_2$-macroglobulin, antithrombin III, factor I (fibrinogen), factor II (prothrombin), factor III (tissue prothrombin), factor V (proaccelerin), factor VII (proconvertin), factor VIII (antihemophilic globulin or AHG), factor IX (Christmas factor, plasma thromboplastin component or PTC), factor X (Stuart-Power factor), factor XI (plasma thromboplastin antecedent or PTA), factor XII (Hageman factor), heparin cofactor II, kallikrein, plasmin, plasminogen, prekallikrein, protein C, protein S, thrombomodulin and combinations thereof.

Cytokines include, but are not limited to, the following: transforming growth factors (TGFs) such as TGF-$\beta$1, TGF-$\beta$2, and TGF-$\beta$3; bone morphogenetic proteins (for example, BMP-1, BMP-2, BMP-3, BMP-4, BMP-5, BMP-6, BMP-7, BMP-8, BMP-9); heparin-binding growth factors (for example, fibroblast growth factor (FGF), epidermal growth factor (EGF), platelet-derived growth factor (PDGF), heparin-binding neurotrophic factor (HBNF), and insulin-like growth factor (IGF)); connective tissue activated peptides (CTAPs), osteogenic factors; colony stimulating factor; interferons, including interferon-$\alpha$, interferon $\alpha$-2a, interferon $\alpha$-2b, interferon $\alpha$-n3, interferon-$\beta$, and interferon-$\gamma$; interleukins, including interleukin-1, interleukin-2, interleukin-3, interleukin-4, interleukin-5, interleukin-6, interleukin-7, interleukin-8, interleukin-9, interleukin-10, interleukin-11, interleukin-12, interleukin-13, interleukin-14, interleukin-15, interleukin-16, and interleukin-17; tumor necrosis factor; tumor necrosis factor-$\alpha$; granuloycte colony-stimulating factor (G-CSF); granulocyte-macrophage colony-stimulating factor (GM-CSF); macrophage colony-stimulating factor; Inhibins (e.g., Inhibin A and Inhibin B); growth differentiating factors (e.g., GDF-1); Activins (e.g., Activin A, Activin B, and Activin AB); midkine (MD); and thymopoietin.

Endorphins are peptides that activate opiate receptors. Agonist and antagonist derivatives of the naturally occurring endorphins are also contemplated. Representative examples of endorphins and pharmacologically active endorphin derivatives include dermorphin, dynorphin, $\alpha$-endorphin, $\beta$-endorphin, $\gamma$-endorphin, $\sigma$-endorphin [Leu$^5$]enkephalin, [Met$^5$]enkephalin, substance P, and combinations thereof.

Peptidyl hormones include, but are not limited to, activin, amylin, angiotensin, atrial natriuretic peptide (ANP), calcitonin (derived from chicken, eel, human, pig, rat, salmon, etc.), calcitonin gene-related peptide, calcitonin N-terminal flanking peptide, cholecystokinin (CCK), ciliary neurotrophic factor (CNTF), corticotropin (adrenocorticotropin hormone, ACTH), corticotropin-releasing factor (CRF or CRH), follicle-stimulating hormone (FSH), gastrin, gastrin inhibitory peptide (GIP), gastrin-releasing peptide, glucagon, gonadotropin-releasing factor (GnRF or GNRH), growth hormone releasing factor (GRF, GRH), human chorionic gonadotropin (hCH), inhibin A, inhibin B, insulin (derived from beef, human, pig, etc.), leptin, lipotropin (LPH), luteinizing hormone (LH), luteinizing hormone-releasing hormone (LHRH), lypressin, $\alpha$-melanocyte-stimulating hormone, $\beta$-melanocyte-stimulating hormone, $\gamma$-melanocyte-stimulating hormone, melatonin, motilin, oxytocin (pitocin), pancreatic polypeptide, parathyroid hormone (PTH), placental lactogen, prolactin (PRL), prolactin-release inhibiting factor (PIF), prolactin-releasing factor (PRF), secretin, somatostatin, somatotropin (growth hormone, GH), somatostatin (SIF, growth hormone-release inhibiting factor, GIF), thyrotropin (thyroid-stimulating hormone, TSH), thyrotropin-releasing factor (TRH or TRF), thyroxine, triiodothyronine, vasoactive intestinal peptide (VIP), and vasopressin (antidiuretic hormone, ADH).

Particularly preferred analogues of LHRH include buserelin, deslorelin, fertirelin, goserelin, histrelin, leuprolide (leuprorelin), lutrelin, nafarelin, tryptorelin and combinations thereof.

Kinins include bradykinin, potentiator B, bradykinin potentiator C, and kallidin and combinations thereof.

Enzymes include transferases, hydrolases, isomerases, proteases, ligases and oxidoreductases such as esterases, phosphatases, glycosidases and peptidases. Specific examples of enzymes include super oxide dismutase (SOD), tissue plasminogen activator (TPA), renin, adenosine deaminase, $\beta$-glucocerebrosidase, asparaginase, dornase-$\alpha$, hyaluronidase, elastase, trypsin, thymidin kinase (TK), tryptophan hydroxylase, urokinase, and kallikrein. Enzyme inhibitors include leupeptin, chymostatin, pepslatin, renin inhibitors, angiotensin converting enzyme (ACE) inhibitors, and the like.

Antibodies include both monoclonal and polyclonal antibodies, as well as antibody fragments, such as the F(ab')$_2$, Fab, Fv and Fc fragments of monoclonal antibodies.

Other peptidyl drugs: Still other peptidyl drugs that provide a desired pharmacological activity can be incorporated into the compositions and delivery systems of the invention. Examples include abarelix, anakinra, ancestim, bivalirudin, bleomycin, bombesin, desmopressin acetate, des-Q14-ghrelin, enterostatin, erythropoeitin, exendin-4, filgrastim, gonadorelin, insulinotropin, lepirudin, magainin I, magainin II, nerve growth factor, pentigetide, thrombopoietin, thymosin α-1, and urotensin II and combinations thereof.

The use of focused acoustic energy in the preparation of peptide arrays substantially prevents exposure of the peptidic molecules to high levels of shear stress. That is, acoustic ejection techniques do not produce high shear forces within fluids (in contrast to techniques that require a nozzle, for example) that can degrade the structure of a peptidic molecule. Evidence of shear stress includes any departure from the original or natural three-dimensional structure of the peptidic molecule, e.g., loss of protein folding. Substantially none—i.e., less than 10%, preferably less than 5%, more preferably less than 1%, most preferably less than 0.1%—of the peptidic molecules in an array prepared using the present methodology exhibit signs of shear stress.

In addition, the peptidic molecules in an array produced using focused acoustic energy are intact and attached to a predetermined site on the substrate surface. This is in contrast to arrays prepared using photolithographic techniques, wherein truncated forms of peptidic molecules (e.g., peptidic molecules missing one or more amino acid residues) are often present. Truncated peptidic molecules can result, for example, when a photoprotecting group fails to detach during in situ synthesis. Furthermore, inaccuracy in mask placement using a photolithographic array preparation technique can result in attachment of individual peptides to unintended sites on the substrate surface. Lastly, photolithographic techniques are not amenable to the accurate placement of pre-purified proteins but are primarily restricted to in situ synthesis of small peptides with fewer than 25 amino acids. None of these problems are encountered when focused acoustic energy is used to prepare arrays.

The peptide arrays of the invention preferably include a lipidic material attached to at least one designated site on the substrate surface. The lipidic material may have been attached to the designated site prior to deposition of the peptidic molecules, or it may be associated with a particular peptidic molecule such as, for example, a peptidic molecule within a phospholipid envelope. In the latter case, the fluid containing the peptidic molecule also includes the lipidic material. While many array-forming techniques are incompatible with lipidic materials, since lipidic compounds tend to be viscous, the present acoustic ejection technique can effectively eject lipidic materials onto a substrate along with the individual peptides.

Examples of suitable lipidic material include, but are not limited to, the following: phospholipids such as phosphorylated diacyl glycerides, and particularly phospholipids selected from the group consisting of diacyl phosphatidylcholines, diacyl phosphatidylethanolamines, diacyl phosphatidylserines, diacyl phosphatidylinositols, diacyl phosphatidylglycerols, diacyl phosphatidic acids, and mixtures thereof, wherein each acyl group contains about 10 to about 22 carbon atoms and is saturated or unsaturated; fatty acids such as isovaleric acid, valeric acid, caproic acid, enanthic acid, caprylic acid, pelargonic acid, capric acid, lauric acid, myristic acid, palmitic acid, stearic acid, arachidic acid, behenic acid, lignoceric acid, oleic acid, linoleic acid, linolenic acid, and arachidonic acid; lower fatty acid esters comprising esters of the foregoing fatty acids, wherein the carboxylic acid group of the fatty acid is replaced with an ester moiety —(CO)—OR wherein R is a $C_1$–$C_3$ alkyl moiety optionally substituted with one or two hydroxyl groups; fatty alcohols corresponding to the aforementioned fatty acids, wherein the carboxylic acid group of the fatty acid is replaced by a —$CH_2OH$ group; glycolipids such as cerebroside and gangliosides; oils, including animal oils such as cod liver oil and, menhaden oil, and vegetable oils such as babassu oil, castor oil, corn oil, cotton seed oil, linseed oil, mustard oil, olive oil, palm oil, palm kernel oil, peanut oil, poppyseed oil, rapeseed oil, safflower oil, sesame oil, soybean oil, sunflower seed oil, tung oil or wheat germ oil; and waxes, i.e., higher fatty acid esters, including animal waxes such as beeswax and shellac, mineral waxes such as montan, petroleum waxes such as microcrystalline wax and paraffin, and vegetable waxes such as carnauba wax.

The peptidic molecule may also be deposited in an aqueous fluid. Aqueous fluids include water per se as well as aqueous solutions, dispersions and suspensions of various nonfluidic materials, and mixtures of water with other liquids.

The peptide array may be a homogenous peptide array (i.e., an array containing the same peptidic molecule) or a heterogeneous peptide array (i.e., an array containing different peptidic molecules). In a homogeneous peptide array, each peptidic molecule is coupled in substantially the same orientation on a substrate. Any technique for binding a peptidic molecule in substantially the same orientation on a substrate may be employed. As will be appreciated by those skilled in the art, the orientation of the peptidic molecule using this approach is substantially preserved, although rotation around chemical bonds is to be expected. Nevertheless, the "exposed" portion of the peptide remains substantially unchanged. In this way, the homogenous array displays the same peptidic molecules in substantially the same orientation. By way of a nonlimiting example, a monoclonal antibody is initially bound to a specific epitope on a peptidic molecule. The peptidic molecule-antibody complex is placed in a fluid and acoustically ejected onto a desired location on a substrate surface covered with antibody-binding protein. The peptidic molecule is in substantially the same orientation since the antibody-binding protein binds to only the Fc portion of the antibody in the antibody-peptidic molecule complex. In another example, a peptidic molecule that has only one exposed terminal carboxyl side chain is acoustically ejected onto a substrate derivatized with an amine functionality such that an amide linkage results. Because the single carboxyl moiety of the peptide is coupled to the reactive amine on the substrate surface, the peptidic compounds on the substrate surface are in substantially uniform arrangement. Alternatively, a substrate surface having monoclonal antibodies attached thereto can bind the acoustically ejected peptidic molecules.

The use of such a focused acoustic ejection system enables preparation of arrays that will generally have a density in the range of approximately 10 to approximately 250,000 peptidic molecules (generally 10 to approximately 250,000 different peptidic molecules) per square centimeter of substrate surface, typically in the range of approximately 400 to approximately 100,000 peptidic molecules (again, generally 400 to approximately 1,000,000 different peptidic molecules) per square centimeter of substrate surface.

However, it must be emphasized that the present method enables preparation of far higher density arrays as well, i.e., arrays comprised of at least about 1,000,000 peptidic molecules per square centimeter of substrate surface, or even in the range of about 1,500,000 to 4,000,000 peptidic molecules per square centimeter of substrate surface. These high density arrays may be prepared on nonporous surfaces, although a significant advantage of using focused acoustic energy technology in the manufacture of combinatorial arrays is that substrates with porous surfaces, and even permeable surfaces, may be used. Prior array fabrication methods have not enabled preparation of high density arrays on porous or permeable surfaces because prior spotting processes are nowhere near as accurate as the present acoustic deposition method, and prior processes have also required larger droplet volumes. Accordingly, prior array fabrication methods have been limited to the preparation of low density arrays on porous surfaces, or higher density arrays on nonporous surfaces. See, for example, U.S. Pat. No. 6,054,270 to Southern. In contrast to prior methods of manufacturing arrays, then, the present acoustic ejection process enables extraordinarily precise deposition of very small droplets, as well as consistency in droplet size and velocity. Very high array densities can now be achieved with high porosity, permeable surfaces. More specifically, the present acoustic ejection method can be used to manufacture high density arrays that can be read with a high precision digitizing scanner capable of 2 μm resolution, by depositing droplets having a volume on the order of 1 pL, resulting in deposited spots about 18 μm in diameter. For ultra-high density arrays, a smaller droplet volume is necessary, typically less than about 0.03 pL (deposition of droplets having a volume on the order of 0.025 pL will result in deposited spots about 4.5 μm in diameter). Localization of deposited droplets using chemical or physical means, such as described in the '270 patent, is unnecessary because acoustic ejection enables precisely directed minute droplets to be deposited with accuracy at a particular site.

Acoustic ejection devices are described in co-pending patent application U.S. Ser. No. 09/669,996 ("Acoustic Ejection of Fluids From a Plurality of Reservoirs"), inventors Ellson, Foote and Mutz, filed Sep. 25, 2000 and assigned to Picoliter, Inc. (Mountain View, Calif.). In addition, FIG. 1 illustrates, in simplified cross-sectional view, a focused acoustic ejection device suitable for ejecting fluids containing peptidic molecules. As with all figures referenced herein, in which like parts are referenced by like numerals, FIG. 1 is not to scale, and certain dimensions may be exaggerated for clarity of presentation.

FIG. 1 illustrates an embodiment of the employed device in simplified cross-sectional view. As with all figures referenced herein, in which like parts are referenced by like numerals, FIG. 1 is not to scale, and certain dimensions may be exaggerated for clarity of presentation. The device 11 includes a plurality of reservoirs, i.e., at least two reservoirs, with a first reservoir indicated at 13 and a second reservoir indicated at 15, each adapted to contain a fluid having a fluid surface, e.g., a first fluid 14 and a second fluid 16 having fluid surfaces respectively indicated at 17 and 19. Fluids 14 and 16 may be the same or different, and may also have acoustic or fluidic properties that are the same or different. As shown, the reservoirs are of substantially identical construction so as to be substantially acoustically indistinguishable, but identical construction is not a requirement. The reservoirs are shown as separate removable components but may, if desired, be fixed within a plate or other substrate. For example, the plurality of reservoirs may comprise individual wells in a well plate, optimally although not necessarily arranged in an array. Each of the reservoirs 13 and 15 is preferably axially symmetric as shown, having vertical walls 21 and 23 extending upward from circular reservoir bases 25 and 27 and terminating at openings 29 and 31, respectively, although other reservoir shapes may be used. The material and thickness of each reservoir base should be such that acoustic radiation may be transmitted therethrough and into the fluid contained within the reservoirs.

The device also includes an acoustic ejector 33 comprised of an acoustic radiation generator 35 for generating acoustic radiation and a focusing means 37 for focusing the acoustic radiation at a focal point within the fluid from which a droplet is to be ejected, near the fluid surface. As shown in FIG. 1, the focusing means 37 may comprise a single solid piece having a concave surface 39 for focusing acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15 and thus to fluids 14 and 16, respectively. The acoustic radiation generator 35 and the focusing means 37 may function as a single unit controlled by a single controller, or they may be independently controlled, depending on the desired performance of the device. Typically, single ejector designs are preferred over multiple ejector designs because accuracy of droplet placement and consistency in droplet size and velocity are more easily achieved with a single ejector.

As will be appreciated by those skilled in the art, any of a variety of focusing means may be employed in conjunction with the present invention. For example, one or more curved surfaces may be used to direct acoustic radiation to a focal point near a fluid surface. One such technique is described in U.S. Pat. No. 4,308,547 to Lovelady et al. Focusing means with a curved surface have been incorporated into the construction of commercially available acoustic transducers such as those manufactured by Panametrics Inc. (Waltham, Mass.). In addition, Fresnel lenses are known in the art for directing acoustic energy at a predetermined focal distance from an object plane. See, e.g., U.S. Pat. No. 5,041,849 to Quate et al. Fresnel lenses may have a radial phase profile that diffracts a substantial portion of acoustic energy into a predetermined diffraction order at diffraction angles that vary radially with respect to the lens. The diffraction angles should be selected to focus the acoustic energy within the diffraction order on a desired object plane.

There are also a number of ways to acoustically couple the ejector 33 to each individual reservoir and thus to the fluid therein. One such approach is through direct contact as is described, for example, in U.S. Pat. No. 4,308,547 to Lovelady et al., wherein a focusing means constructed from a hemispherical crystal having segmented electrodes is submerged in a liquid to be ejected. The aforementioned patent further discloses that the focusing means may be positioned at or below the surface of the liquid. However, this approach for acoustically coupling the focusing means to a fluid is undesirable when the ejector is used to eject different fluids in a plurality of containers or reservoirs, as repeated cleaning of the focusing means would be required in order to avoid cross-contamination. The cleaning process would necessarily lengthen the transition time between each droplet ejection event. In addition, in such a method, fluid would adhere to the ejector as it is removed from each container, wasting material that may be costly or rare.

Thus, a preferred approach would be to acoustically couple the ejector to the reservoirs and reservoir fluids without contacting any portion of the ejector, e.g., the focusing means, with any of the fluids to be ejected. To this end, the present invention provides an ejector positioning means for positioning the ejector in controlled and repeatable acoustic coupling with each of the fluids in the reservoirs to eject droplets therefrom without submerging the ejector therein. This typically involves direct or indirect contact between the ejector and the external surface of each reservoir. When direct contact is used in order to acoustically couple the ejector to each reservoir, it is preferred that the direct contact is wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs having a specially formed inverse surface.

Optimally, acoustic coupling is achieved between the ejector and each of the reservoirs through indirect contact, as illustrated in FIG. 1. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and each reservoir. In addition, it is important to ensure that the fluid medium is substantially free of material having different acoustic properties than the fluid medium itself. As shown, the first reservoir 13 is acoustically coupled to the acoustic focusing means 37 such that an acoustic wave is generated by the acoustic radiation generator and directed by the focusing means 37 into the acoustic coupling medium 41, which then transmits the acoustic radiation into the reservoir 13.

In operation, each reservoir 13 and 15 of the device is filled with a fluid containing a peptidic molecule, as explained above. The acoustic ejector 33 is positioned by means of ejector positioning means 43, shown below reservoir 13, in order to achieve acoustic coupling between the ejector and the reservoir through acoustic coupling medium 41. Substrate 45 is positioned above and in proximity to the first reservoir 13 such that one surface of the substrate, shown in FIG. 1 as underside surface 51, faces the reservoir and is substantially parallel to the surface 17 of the fluid 14 therein. Once the ejector, the reservoir and the substrate are in proper alignment, the acoustic radiation generator 35 is activated to produce acoustic radiation that is directed by the focusing means 37 to a focal point 47 within fluid 14 near the fluid surface 17. As a result, droplet 49 is ejected from the fluid surface 17 onto a designated site on the underside surface 51 of the substrate. The ejected droplet may be retained on the substrate surface by solidifying thereon after contact; in such an embodiment, it is necessary to maintain the substrate surface at a low temperature, i.e., at a temperature that results in droplet solidification after contact. Alternatively, or in addition, a molecular moiety, e.g., a peptidic molecule, within the droplet attaches to the substrate surface after contact, through, for example, adsorption, physical immobilization, or covalent binding.

Figure 2:
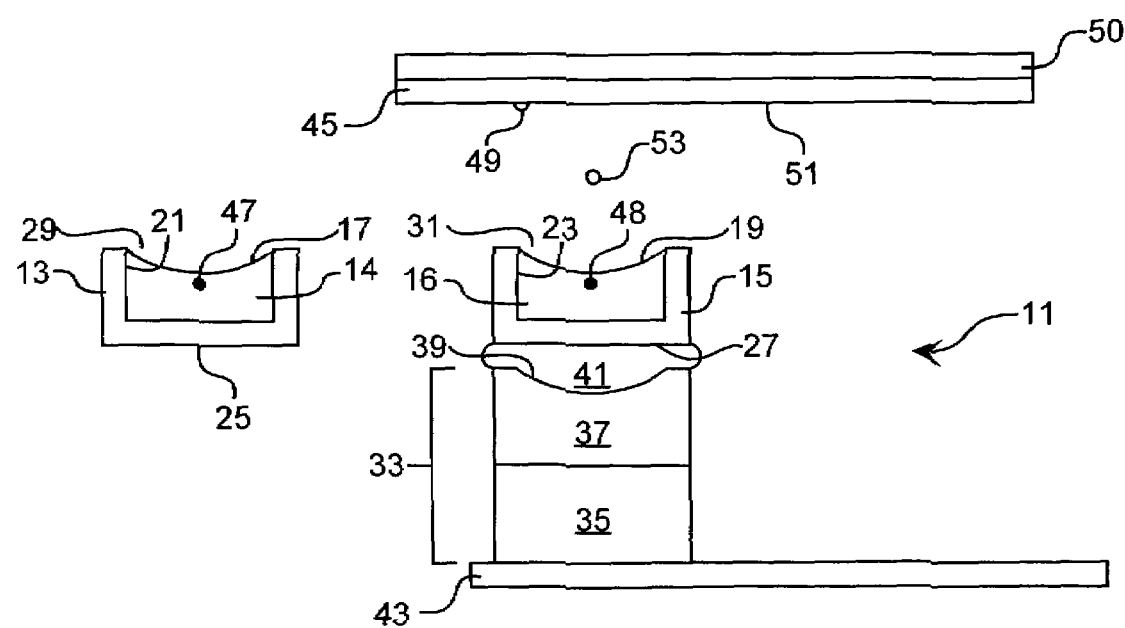

Then, as shown in FIG. 2, a substrate positioning means 50 may be used to reposition the substrate 45 over reservoir 15 in order to receive a droplet therefrom at a second designated site. FIG. 2 also shows that the ejector 33 has been repositioned by the ejector positioning means 43 below reservoir 15 and in acoustically coupled relationship thereto by virtue of acoustic coupling medium 41. Once properly aligned as shown in FIG. 2, the acoustic radiation generator 35 of ejector 33 is activated to produce acoustic radiation that is then directed by focusing means 37 to a focal point 48 within the reservoir fluids in reservoir 15, thereby ejecting droplet 53 onto the substrate. It should be evident that such operation is illustrative of how the inventive device may be used to eject a plurality of fluids from reservoirs in order to form a pattern, e.g., an array, on the substrate surface 51. It should be similarly evident that the device may be adapted to eject a plurality of droplets from one or more reservoirs onto the same site of the substrate surface.

As discussed above, either individual, e.g., removable, reservoirs or well plates may be used to contain fluids that are to be ejected, wherein the reservoirs or the wells of the well plate are preferably substantially acoustically indistinguishable from one another. Also, unless it is intended that the ejector is to be submerged in the fluid to be ejected, the reservoirs or well plates must have acoustic transmission properties sufficient to allow acoustic radiation from the ejector to be conveyed to the surfaces of the fluids to be ejected. Typically, this involves providing reservoir or well bases that are sufficiently thin to allow acoustic radiation to travel therethrough without unacceptable dissipation. In addition, the material used in the construction of reservoirs must be compatible with the fluids contained therein. Thus, if it is intended that the reservoirs or wells contain an organic solvent such as acetonitrile, polymers that dissolve or swell in acetonitrile would be unsuitable for use in forming the reservoirs or well plates. For water-based fluids, a number of materials are suitable for the construction of reservoirs and include, but are not limited to, ceramics such as silicon oxide and aluminum oxide, metals such as stainless steel and platinum, and polymers such as polyester and polytetrafluoroethylene. Many well plates suitable for use with the employed device are commercially available and may contain, for example, 96, 384 or 1536 wells per well plate. Manufactures of suitable well plates for use in the employed device include Corning Inc. (Corning, N.Y.) and Greiner America, Inc. (Lake Mary, Fla.). However, the availability of such commercially available well plates does not preclude manufacture and use of custom-made well plates containing at least about 10,000 wells, or as many as 100,000 wells or more. For array forming applications, it is expected that about 100,000 to about 4,000,000 reservoirs may be employed. In addition, to reduce the amount of movement and time needed to align the ejector with each reservoir or reservoir well, it is preferable that the center of each reservoir is located not more than about 1 centimeter, preferably not more than about 1 millimeter and optimally not more than about 0.5 millimeter from a neighboring reservoir center.

It will be appreciated that various components of the device may require individual control or synchronization to form an array on a substrate. For example, the ejector positioning means may be adapted to eject droplets from each reservoir in a predetermined sequence associated with an array to be prepared on a substrate surface. Similarly, the substrate positioning means for positioning the substrate surface with respect to the ejector may be adapted to position the substrate surface to receive droplets in a pattern or array thereon. Either or both positioning means, i.e., the ejector positioning means and the substrate positioning means, may be constructed from, for example, motors, levers, pulleys, gears, a combination thereof, or other electromechanical or mechanical means known to one of ordinary skill in the art. It is preferable to ensure that there is a correspondence between the movement of the substrate, the movement of the ejector and the activation of the ejector to ensure proper array formation.

The device may also include certain performance-enhancing features. For example, the device may include a cooling means for lowering the temperature of the substrate surface to ensure, for example, that the ejected droplets adhere to the substrate. The cooling means may be adapted to maintain the substrate surface at a temperature that allows fluid to partially or preferably substantially solidify after the fluid comes into contact therewith. The device may also include a means for maintaining fluid in the reservoirs at a constant temperature, since repeated application of acoustic energy to a fluid will result in heating, which can in turn cause unwanted changes in fluid properties such as viscosity, surface tension and density. Design and construction of such temperature maintaining means are known to one of ordinary skill in the art and will involve incorporation of at least one heating element and/or at least one cooling element. Generally, it is desired that a fluid containing a peptidic molecule be kept at a constant temperature without deviating more than about 1° C. or 2° C. therefrom. In addition, for fluids containing a peptidic molecule that is particularly heat sensitive, it is preferred that the fluid be kept at a temperature that does not exceed about 10° C. above the melting point of the fluid, preferably at a temperature that does not exceed about 5° C. above the melting point of the fluid. Thus, for example, when the fluid containing a peptidic molecule is aqueous, it may be optimal to keep the fluid at about 4° C. during ejection.

In some cases, a substrate surface may be modified prior to formation of a peptide array thereon. Surface modification may involve functionalization or defunctionalization, smoothing or roughening, changing surface conductivity, coating, degradation, passivation or otherwise altering the surface's chemical composition or physical properties. A preferred surface modification method involves altering the wetting properties of the surface, for example to facilitate confinement of a droplet ejected on the surface within a designated area or enhancement of the kinetics for the surface attachment of molecular moieties contained in the ejected droplet. A preferred method for altering the wetting properties of the substrate surface involves deposition of droplets of a suitable surface modification fluid at each designated site of the substrate surface prior to acoustic ejection of fluids to form an array thereon. In this way, the "spread" of the acoustically ejected droplets may be optimized and consistency in spot size (i.e., diameter, height and overall shape) ensured. One way to implement the method involves acoustically coupling the ejector to a modifier reservoir containing a surface modification fluid and then activating the ejector, as described in detail above, to produce and eject a droplet of surface modification fluid toward a designated site on the substrate surface. The method is repeated as desired to deposit surface modification fluid at additional designated sites. This method is useful in a number of applications including, but not limited to, spotting oligomers to form an array on a substrate surface or synthesizing array oligomers in situ. As noted above, other physical properties of the surface that may be modified include thermal properties and electrical conductivity.

The aforementioned focused acoustic energy system enables ejection of droplets at a rate of at least about 1,000,000 droplets per minute from the same reservoir, and at a rate of at least about 100,000 drops per minute from different reservoirs. In addition, current positioning technology allows for the ejector positioning means to move from one reservoir to another quickly and in a controlled manner, thereby allowing fast and controlled ejection of different fluids. That is, current commercially available technology allows the ejector to be moved from one reservoir to another, with repeatable and controlled acoustic coupling at each reservoir, in less than about 0.1 second for high performance positioning means and in less than about 1 second for ordinary positioning means. A custom designed system will allow the ejector to be moved from one reservoir to another with repeatable and controlled acoustic coupling in less than about 0.001 second. In order to provide a custom designed system, it is important to keep in mind that there are two basic kinds of motion: pulse and continuous. Pulse motion involves the discrete steps of moving an ejector into position, emitting acoustic energy, and moving the ejector to the next position; again, using a high performance positioning means with such a method allows repeatable and controlled acoustic coupling at each reservoir in less than 0.1 second. A continuous motion design, on the other hand, moves the ejector and the reservoirs continuously, although not at the same speed, and provides for ejection during movement. Since the pulse width is very short, this type of process enables over 10 Hz reservoir transitions, and even over 1000 Hz reservoir transitions.

In order to ensure the accuracy of fluid ejection, it is important to determine the location and the orientation of the fluid surface from which a droplet is to be ejected with respect to the ejector. Otherwise, ejected droplets may be improperly sized or travel in an improper trajectory. Thus, another embodiment of the invention relates to a method for determining the height of a fluid surface in a reservoir between ejection events. The method involves acoustically coupling a fluid-containing reservoir to an acoustic radiation generator and activating the generator to produce a detection acoustic wave that travels to the fluid surface and is reflected thereby as a reflected acoustic wave. Parameters of the reflected acoustic radiation are then analyzed in order to assess the spatial relationship between the acoustic radiation generator and the fluid surface. Such an analysis will involve the determination of the distance between the acoustic radiation generator and the fluid surface and/or the orientation of the fluid surface in relationship to the acoustic radiation generator.

More particularly, the acoustic radiation generator may be activated so as to generate low energy acoustic radiation that is insufficiently energetic to eject a droplet from the fluid surface. This is typically done by using an extremely short pulse (on the order of tens of nanoseconds) relative to that normally required for droplet ejection (on the order of microseconds). By determining the time it takes for the acoustic radiation to be reflected by the fluid surface back to the acoustic radiation generator and then correlating that time with the speed of sound in the fluid, the distance B and thus the fluid height—may be calculated. Of course, care must be taken in order to ensure that acoustic radiation reflected by the interface between the reservoir base and the fluid is discounted. It will be appreciated by those of ordinary skill in the art of acoustic microscopy that such a method employs conventional or modified sonar techniques.

Once the analysis has been performed, an ejection acoustic wave having a focal point near the fluid surface is generated in order to eject at least one droplet of the fluid, wherein the optimum intensity and directionality of the ejection acoustic wave is determined using the aforementioned analysis optionally in combination with additional data. The "optimum" intensity and directionality are generally selected to produce droplets of consistent size and velocity. For example, the desired intensity and directionality of the ejection acoustic wave may be determined by using not only the spatial relationship assessed as above, but also geometric data associated with the reservoir, fluid property data associated with the fluid to be ejected, and/or by using historical droplet ejection data associated with the ejection sequence. In addition, the data may show the need to reposition the ejector so as to reposition the acoustic radiation generator with respect to the fluid surface, in order to ensure that the focal point of the ejection acoustic wave is near the fluid surface, where desired. For example, if analysis reveals that the acoustic radiation generator is positioned such that the ejection acoustic wave cannot be focused near the fluid surface, the acoustic radiation generator is repositioned using vertical, horizontal and/or rotational movement to allow appropriate focusing of the ejection acoustic wave.

In general, screening for the properties of the array constituents will be performed in a manner appropriate to the particular array. Screening for biological properties such as ligand binding or hybridization may be generally performed in the manner described in U.S. Pat. Nos. 5,744,305 and 5,445,934 to Fodor et al. U.S. Pat. Nos. 5,143,854 and 5,405,783 to Pirrung et al., and U.S. Pat. Nos. 5,700,637 and 6,054,270 to Southern et al.

Screening for material properties may be effected by measuring physical and chemical properties, including by way of example rather than limitation, measuring the chemical, mechanical, optical, thermal, electrical or electronic, by routine methods easily adaptable to microarrays. In addition to bulk material characteristics or properties, surface specific properties may be measured by surface specific physical techniques and physical techniques that are adapted to surface characterization. Macroscopic surface phenomena including adsorption, catalysis, surface reactions including oxidation, hardness, lubrication and friction, may be examined on a molecular scale using such characterization techniques. Various physical surface characterization techniques include without limitation diffractive techniques, spectroscopic techniques, microscopic surface imaging techniques, surface ionization mass spectroscopic techniques, thermal desorption techniques and ellipsometry. It should be appreciated that these classifications are arbitrary made for purposes of explication, and some overlap may exist.

Peptide arrays, as prepared using the present method, have a variety of applications. For example, homogeneous protein arrays—i.e., arrays having proteins oriented in substantially the same orientation—allow for the facile quantitation of antibody titer by determining the number of antibodies that bind to the array from a known sample volume. Alternatively, the relative affinities of ligands to a peptidic molecule may be readily established by identifying the number of peptide-bound ligands and comparing the number for each ligand tested. Homogeneous peptide arrays in which the peptidic molecules are in different orientations are useful, for example, in high throughput screening applications wherein a large number of potential ligands are passed over the array. Those that bind to the peptide array can be separated and further evaluated, via size-exclusion chromatography, mass spectrometry, or the like. Heterogeneous peptide arrays are useful for screening a particular ligand against a large number of peptidic molecules. The ligand is allowed to come into contact with the peptide array and unbound ligand is washed away. The array is read to identify signals indicating that the ligand has affinity for a particular peptide. That is, by labeling potential ligands, e.g., with a fluorescent label, in a library of compounds, contacting the library with the peptide array under binding conditions, allowing binding (if any) to occur, and subsequently washing unbound compounds, it is possible to detect whether any compound in the library binds to the biological receptor by detecting the fluorescent signal, for example with a confocal detection apparatus. In this way, it is possible to determine which receptor is bound by determining the "address" of the signal that correlates to the specific biological receptor placed at that address during array manufacture. The bound ligand can then be separated, such as by treating the array with a strong acid, and collected for further study. The method thus enables one to screen a large number of potential ligands that can act as antagonists or agonists for a particular biological receptor. Once identified, ligands can serve as probes or be formulated into pharmaceutical preparations. Another application is the use of homogeneous arrays composed of many replicates of two proteins that have a measurable binding affinity. A plurality of molecules may then be added to the array to see if these molecules enhance or disrupt protein-protein binding.

It is to be understood that while the invention has been described in conjunction with the preferred specific embodiments thereof, the foregoing description is intended to illustrate and not limit the scope of the invention. Other aspects, advantages and modifications will be apparent to those skilled in the art to which the invention pertains.

All patents, patent applications, journal articles and other references cited herein are incorporated by reference in their entireties.

The following examples are put forth so as to provide those of ordinary skill in the art with a complete disclosure and description of how to implement the invention, and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. and pressure is at or near atmospheric.

EXAMPLE 1

This example demonstrates that deposition of a peptidic molecule on a substrate using focused acoustic energy does not affect the structure or activity of the molecule.

The peptidic molecule employed was TAQ polymerase, a thermostable DNA polymerase. TAQ Polymerase Master Mix from Qiagen was used as the source for TAQ polymerase.

The polymerase was ejected using a focused acoustic energy system from a well plate onto a polypropylene receiving tube using an F=2 lens. The enzymatic activity of the deposited polymerase was then evaluated using a polymerase chain reaction (PCR) assay. For this experiment, TAQ was used to amplify a randomly chosen sequence of the Puc18 vector (Amersham). The following primers were used:

Forward 5' AACGTTGTAAAACGACGGCCAGT (SEQ ID NO.: 1); and

Reverse 5' ACGATAGTTACCGGATAAGGCGC (SEQ ID NO.: 2) at final concentrations of 1.0 µM each.

The composition of the reaction mixture was 1 µg Puc18 DNA, 25 µL master mix, 22 µL $H_2O$ and 1 µL of each primer at a starting concentration of 50 µM. The cycling reaction was performed as follows: 4 minutes at 96° C.; and then 30 cycles of 45 seconds at 96° C., 45 seconds at 52° C., and 45 seconds at 72° C. This was followed by a 10 minute extension reaction at 72° C. The extent of the PCR reaction was evaluated by agarose gel electrophoresis stained with ethidium bromide at a concentration of 0.5 µg/ml. The thermocycling reaction was performed on an instrument manufactured by MWG Biotech, Ebersberg, Germany.

The intensity of the 1 kb DNA product band for TAQ transferred via focused acoustic ejection was similar to that of the band intensity for non-ejected TAQ. Therefore, it appears that this protein may be subjected to focused acoustic ejection without significant loss of enzymatic activity.

Because some of the reagents used in peptide deposition and/or synthesis are moisture-sensitive, deposition and/or coupling must be performed under anhydrous conditions in a sealed chamber or container. This may be accomplished by performing the acoustic spotting in a chamber of desiccated gas obtained by evacuating a chamber that contains the acoustic ejection device and synthetic substrate and replacing the evacuated atmospheric gas with desiccated $N_2$ by routine methods; washing steps may be performed in the chamber or by removing the slide and washing it in an appropriate environment, for example, by a staining jar fitted with a drying tube. Because washing and other steps such as detritylation may be more conveniently carried out outside the chamber, the synthesis may also be performed in a controlled humidity room that contains the controlled atmosphere chamber in which the spotting is done, with the other steps carried out in the room outside the chamber. Alternatively, a controlled humidity room may be used for spotting with other steps carried out in less controlled environment by use of, for example, a staining jar fitted with a drying tube.

EXAMPLE 2

This example describes preparation of a peptide array in the form of a combinatorial library, and demonstrates the use of focused acoustic energy in the combinatorial solid phase synthesis of all tetramers that can be made from the 20 naturally occurring amino acids ($20^4$ or=160,000 amino acid sequences in all) in a quadruplicate array format. Four identical copies of the combinatorial array to be prepared are contained in a 1 cm×1 cm area nominally divided into four quadrants, each quadrant containing 250,000 synthesized sites of size 10 µm×10 µm arrayed in 500 rows and 500 columns. Only 400 rows and columns are used in each quadrant; the first and last 50 rows and columns are not used for synthesis, and function to space the four identical arrays from each other and the edges of the area, although alternative arrangement of the four identical arrays can obtain greater distance between arrays by moving each array closer to the corners of the square area. In addition to systematically generating the combinatorial sequences, deposition of the monomers employs a systematic method of ensuring that similar amino acid sequences are less likely to be adjacent or near to each other. Although many such methods exist, with some requiring sophisticated computation, the scheme used relies on a basic sequential list of amino acids that is phase shifted as the row number increases. The 20 natural amino acids can be listed sequentially based on the alphabetic order of their single letter abbreviations, in which case: Ala (A) is "1"; Cys (C) is "2"; Asp (D) is 3; . . . Val (V) is "19"; and Trp (W) is "20".

For the first monomer deposited, in the first row in a given quadrant in which a peptide is synthesized, which is the $51^{st}$ nominal row in that quadrant, beginning with the first synthetic column ($51^{st}$ nominal column) amino acids (as activated for the synthesis described in more detail below) are deposited as the basic sequential list from 1 to 20 in alphabetical order of the one letter abbreviations. Beginning with the second synthetic row ($52^{nd}$ nominal row), the order is shifted by one position starting at "2" and returning to "1" after "20" (2, 3, 4, 5 . . . 19, 20, 1); thus for the quadruplicate spaced array arrangement being made, in the $52^{nd}$ nominal row (second synthetic row) of a given quadrant, the first amino acid deposited in the $51^{st}$ and $431^{st}$ nominal column of the $52^{nd}$ nominal row is "2" or Cys, and the amino acids deposited in the $68^{th}$ and $448^{th}$, $69^{th}$ and $449^{th}$, and $70^{th}$ and $450^{th}$ nominal columns of this row are 19, 20 and 1 respectively (V, W, A).

Additional monomers are added in the quadrants as follows, although numerous alternatives exist. For the second monomer in the first synthetic row ($51^{st}$ nominal row) the monomer deposition order for the second monomer is the same as for the first monomer in the first 20 synthetic columns (nominal 51–70) of this row, and the order is shifted by one for each successive group of 20 synthetic columns, thus the order is 2, 3 . . . 19, 20, 1 for nominal columns 71–90 (hereinafter denoted [71–90]-{2, 3 . . . 19, 20, 1}) and according to this notation: [91–110]-{3, 4 . . . 20, 1, 2}; [111–130]-{4, 5 . . . 1, 2, 3} . . . [431–450]-{20, 1 . . . 17, 18, 19}. For the second and third monomers in the second synthetic row ($52^{nd}$ nominal row) the monomer deposition order is shifted by one relative to the order for the underlying monomer in the first 20 synthetic columns (nominal 51–70) of this row, and the order is shifted by one for each successive group of 20 synthetic columns, thus for the second monomer the order is 3, 4 . . . 20, 1, 2 for nominal columns 51–70 and: [71–90]-{4, 5 . . . 1, 2, 3} [91–110]-{5, 6 . . . 2, 3, 4}; [111–130]-6, 7 . . . 3, 4, 5} . . . [431–450]-{2, 3 . . . 19, 20, 1 }. Note that for the second monomer of the second synthetic row, the shift relative to the order of the first monomer in the first monomer in the first 20 columns of the first row ({1, 2 . . . 18, 19, 20}), is 2 because one is the shift between subsequent monomers ($1^{st} \Rightarrow 2^{nd}$; $2^{nd} \Rightarrow 3^{rd}$) and the first monomer of the second synthetic row is shifted by one relative to the first monomer of the first synthetic row. For the second and third monomers in the third synthetic row ($53^{rd}$ nominal row) the monomer deposition order is shifted by two relative to the order for the underlying monomer in the first 20 synthetic columns (nominal 51–70) of this row, and the order is shifted by one for each successive group of 20 synthetic columns, thus the order for the second monomer is 5 . . . 20, 1, 2, 3, 4 for nominal columns 51–70 and: [71–90]-{6 . . . 1, 2, 3, 4, 5}, [91–110]-{7, . . . 2, 3, 4, 5, 6}, [111–130]-{8, . . . 4, 5, 6, 6, 7} . . . [431–450]-{4, . . . 19, 20, 1, 2, 3 }. For the second monomer in the Nth synthetic row (nominal row=50+N) the monomer deposition order for the second monomer is shifted by (N−1) relative to the order for the first monomer in the first 20 synthetic columns (nominal 51–70) of this row, and the order is shifted by one for each successive group of 20 synthetic columns, thus (for (k*N+a)>20, (k*N+a) is shifted as beginning with N+a−20*I, where I is the integer dividend of the quotient of (k*N+a) and 20, representing number of cycles with each integral multiple of 20 representing unshifted) the order for the second monomer is (2*N−1), 2*N . . . (2*N−3), (2*N−2) for nominal columns 51–70 and: [71–90]-{(2*N . . . (2*N−2), (2*N−1)}, [91–110]-{(2*N+1), (2*N+2) . . . (2*N−1), 2*N}, [111–130]-{(2*N+2), (2*N+3) . . . 2*N, (2*N+1)} . . . [431–450]-{(2*N−2), (2*N−1) . . . (2*N−4), (2*N−3)}. Thus for the second monomer in the $400^{th}$ synthetic row ($450^{th}$ nominal row) the monomer deposition order for the second monomer begins with 19 (799–780) is circularly shifted by 18 relative to the order for the first monomer in the first 20 synthetic columns (nominal 51–70) of the first row, and the order is shifted by one for each successive group of 20 synthetic columns, thus the order is 19, 20 . . . (17), (18) for nominal columns 51–70 and: [71–90]-{20, 1 . . . 17, 18, 19}, [91–110]-{1, 2 . . . 18, 19, 20}, [111–130]-{2, 3 . . . 19, 20, 1} . . . [431–450]-{20, 1 . . . 17, 18, 19}. Note that for the second monomer of the Nth synthetic row, the shift relative to the order of the first monomer in the in the first 20 synthetic columns of the first row ({1, 2 . . . 18, 19, 20}), is 2*(N−1) because (N−1) is the shift between subsequent monomers ($1^{st} \Rightarrow 2^{nd}$; $2^{nd} \Rightarrow 3^{rd}$) and the first monomer of a synthetic row N is shifted by (N−1) relative to the first monomer of the first synthetic row.

The synthetic chemical steps are modified from known solid phase synthetic techniques (as described, for example, in Geysen et al., International Patent Application PCT/AU84/00039, now WO 84/83564) that are adapted from the pioneering solid phase peptide synthesis of Merrifield et al. ((1965) *Nature* 207:(996):522–23; (1965) *Science* 150(693) 178–85; (1966) *Anal. Chem.* 38(13):1905–14; (1967) *Recent. Prog. Horm. Res.* 23:451–82). The conventional methods of solid phase peptide synthesis as taught in these seminal papers are described in detail in Ericksen, B. W. and Merrifield, R. B. (1973) *The Proteins* 2:255–57 Academic Press, New York, and Meinhofer, J. (1976) *The Proteins* 2:45–267 Academic Press, New York. Briefly, all these methods add amino acid monomers protected by tert-butoxycarbonyl (t-butoxycarbonyl, t-Boc) at their amino groups, including their alpha amino groups ($N^\alpha$) to a nascent peptide that is attached to the substrate at the carboxy-terminal (C-terminal). The carbonyl moiety of the $N^\alpha$-t-Boc amino acid to be added to the peptide is activated to convert the hydroxyl group of the carboxylic moiety into an effective leaving group; resembling an acid anhydride in reactivity, using dicyclohexylcarbodiimide (DCC) to permit nucleophilic displacement by the terminal N of the nascent peptide to form a peptide bond that adds the monomer to the forming peptide. The newly added monomer has an N-terminus protected from further reaction by t-Boc, which is removed with trifluoroacetic acid (TFA), rendering the terminal amino group protonated, followed by deprotonation of the terminal amino group with triethylamine (TEA) to yield the reactive free amino group suitable for addition of another monomer.

The substrate employed is polyethylene, although the classic substrate for solid phase peptide synthesis, divinylbenzene cross-linked polystyrene chloromethylated by Friedel-Crafts reaction of the polystyrene resin on approximately one in four aromatic rings, could also be employed. Preparation of the polyethylene substrate, described in Geysen et al., International Patent Application PCT/AU84/00039, published as WO 84/83564, involves γ-ray irradiation (1 mrad dose) of polyethylene immersed in aqueous acrylic acid (6% v/v) to yield reactive polyethylene polyacrylic acid (PPA), according to the method of Muller-Schulte et al. (1982) *Polymer Bulletin* 7:77–81. $N^\alpha$-t-Boc-Lysine methyl ester is then coupled to the PPA by the Lysine ε-amino side chain. After deprotection of the $N^\alpha$ by removal of the t-Boc with TFA followed by TEA, DCC/$N^\alpha$-t-Boc-Alanine is added to couple t-Boc-Ala to the $N^\alpha$ of the Lys, thereby forming a peptide like $N^\alpha$-t-Boc-Ala-Lys-ε-N-PPA linker to which the DCC activated $N^\alpha$-t-Boc-amino acid monomers can be sequentially added to form the desired polymers upon deprotection of the $N^\alpha$ group of the $N^\alpha$-t-Boc-Ala.

The polyethylene substrate can be commercially available smooth polyethylene sheet material, of various thicknesses. Polyethylene beads may be adhered to a surface in a manner that allows them to be separated from the surface by use of low molecular weight polyethylene as an adhesive. Appropriately sized polyethylene beads, activated, for example, by γ-irradiation in the presence of acrylic acid to form PPA, may be applied to a smooth polyethylene surface or a glass, or other surface coated with low molecular weight polyethylene, or the adhesion step can be performed prior to activation.

For an array format, and to increase the effective surface area for polymer formation and enhance adhesion of acoustically ejected reagent droplets to the synthetic substrate, polyethylene fiber sheet material, approximate thickness 25 μm, is heat or fusion bonded to a smooth polyethylene backing approximately 0.15 cm thick to form a polyethylene fiber coated rough permeable substrate. The fiber-coated sheet is cut into strips having the approximate dimensions of a commercial slide, and γ-irradiated (1 mrad) in 6% v/v aqueous acrylic acid to form the PPA activated substrate. The substrate must be adequately dried because the t-Boc-protected and DCC-activated reagents are water sensitive, and the water contained in acidic reagents such as TFA can hydrolyze peptide bonds. Thus, anhydrous synthetic conditions are required throughout. Conventional drying of the substrate is effected with warm dry air at atmospheric or subatmospheric pressure by routine methods; specifically, the slides are washed with MeOH, $Et_2O$, then air dried and stored in desiccated form at −20° C. until use.

The sequential combinatorial addition of monomers is performed with all sites spotted with the appropriate DCC/$N^\alpha$-t-Boc-amino acid. The basic quasi-parallel combinatorial synthesis of all tetramers that can be made from the naturally occurring amino acids may be performed in 44 steps excluding substrate preparation. As no selective linker deprotection is required, the substrate is immersed in TFA in a staining jar fitted with a drying tube, then washed, and immersed in TEA, and washed again, all under anhydrous conditions. The synthesis must be carried so that ejection of the fluid droplets occurs in a controlled atmosphere, which is dry and inert to the reagents used. This may be done by performing acoustic spotting in a chamber of desiccated gas obtained by evacuating a chamber that contains the acoustic ejection device and synthetic substrate and then replacing the evacuated atmospheric gas with desiccated $N_2$; washing steps may be performed in the chamber or by removing the slide and washing it in an appropriate environment, for example, by a staining jar fitted with a drying tube. Because washing and other steps such as detritylation may be more conveniently carried out outside the chamber, the synthesis may also be performed in a controlled humidity room that contains the controlled atmosphere chamber in which the spotting is done, with the other steps carried out in the room outside the chamber. Alternatively, a controlled humidity room may be used for spotting, with other steps carried out in less controlled environment by use of, for example, a staining jar fitted with a drying tube.

Use of pre-synthesized short oligopeptides can also be used in lieu of amino acid monomers. Since focused acoustic ejection enables the rapid transition from the ejection of one fluid to another, many oligopeptides can be provided in small volumes on a single substrate (such as a microtiter plate) to enable faster assembly of amino acid chains. For example, all possible peptide dimers may be synthesized and stored in a well plate of over 400 wells. Construction of the tetramers can than be accomplished by deposition of only two dimers per site and a single linking step. Extending this further, a well plate with at least 8000 wells can be used to construct peptides with trimers.

EXAMPLE 3

This example demonstrates the use of focused acoustic ejection technology in generating peptidic arrays. Acoustic ejection of antibiotin polyclonal antibody (obtained from Sigma, St Louis, Mo.), green fluorescent protein (GFP) (obtained from Roche Biochemicals, Palo ALto, Calif.), anti-GFP monoclonal antibody (obtained from Roche Biochemicals, Palo Alto, Calif.), and lysozyme (obtained from Sigma, St Louis, Mo.), was carried out using an F=3 lens with a 6 mm aperture and a nominal 18 mm focal length in the reservoir fluid (40% glycerol, 60% phosphate buffered saline [PBS], pH=7.5).

Peptidic solutions were prepared in the aforementioned reservoir fluid with the peptidic molecules-antibiotin, GFP, anti-GFP and lysozyme—at a concentration of 100 μg/mL for anti-GFP, GFP and lysozyme (as a negative control). The solutions were printed onto aldehyde-coated slides obtained from NOAB Diagnostics (Mississauga, Ontario, Canada) and epoxy-coated slides obtained from Eppendorf AG (Hamburg, Germany). Droplet size was 60 picoliters and produced 120 μm spots. The spots were placed 500 μm apart. The printed arrays were then incubated for 15 hours at room temperature in a humid chamber, followed by washing in PBS-lysozyme (1% weight/volume) for one minute, and finally by a 1X PBS wash. Labels—(1) 100 μg/mL Biotin, and (2) 0.5 μg/mL GFP)—were diluted into a PBS solution containing 0.1% Tween-20 (v/v) and 1% lysozyme (PBS-T-L), and the printed arrays were incubated with the label solution for 90 minutes at room temperature. The slides were washed in 1X PBS and 100 μg/ml Cy3-streptavidin was added in PBS-T-L buffer.

After 30 minutes further incubation at room temperature, the arrays were rinsed once with PBS, then 3 times with PBS containing 0.1% Tween-20(v/v) for 3 minutes, followed by two rinses with PBS. The rinsed arrays were dried with a stream of nitrogen gas, and scanned on an Axon 4000B (Union City, Calif.) scanner.

All peptidic materials were found to maintain activity after arraying as confirmed by the presence of binding activity for the antibodies, and by fluorescence, in the case of GFP. GFP and the fluorescently labeled antibodies exhibited higher signal than unlabeled lysozyme, used here as a negative control.

We claim:

1. A method for preparing an array comprised of a plurality of peptidic molecules attached to a substrate surface, the method comprising applying focused acoustic energy to each of a plurality of reservoirs each containing a peptidic molecule in a fluid, wherein the distance between the centers of any two adjacent reservoirs is less than about 1 centimeter, and the focused acoustic energy is applied in a manner effective to eject a droplet from each reservoir toward a different site on a substrate surface, wherein the peptidic molecules are selected from the group consisting of pharmacologically active peptides, polypeptides, and proteins.

2. The method of claim 1, wherein the focused acoustic energy is applied to each of the plurality of reservoirs by (a) acoustically coupling each reservoir in succession to an ejector that produces acoustic radiation; and (b) following each acoustic coupling step, activating the ejector to generate acoustic radiation having a focal point sufficiently near the fluid surface so as to eject a fluid droplet from the reservoir toward a designated site on the substrate surface.

3. The method of claim 1, wherein each peptidic molecule is comprised of about 5 to about 10,000 amino acids.

4. The method of claim 3, wherein each peptidic molecule is comprised of about 5 to about 1,000 amino acids.

5. The method of claim 1, wherein each peptidic molecule is an oligopeptide, a polypeptide or protein.

6. The method of claim 5, wherein each peptidic molecule is selected from the group consisting of enzymes, antibodies, antigens, coagulation modulators, cytokines, endorphins, peptidyl hormones and kinins.

7. The method of claim 1, wherein each peptidic molecule is different.

8. The method of claim 1, wherein the distance between the centers of any two reservoirs is less than about 1 millimeter.

9. The method of claim 8, wherein the distance between the centers of any two reservoirs is less than about 0.5 millimeter.

10. The method of claim 2, wherein the fluid has a viscosity of at least about 40 cP.

11. The method of claim 10, wherein the fluid has a viscosity of at least about 100 cP.

12. The method of claim 11, wherein the fluid has a viscosity of at least about 1000 cP.

13. The method of claim 1, wherein at least one of the reservoirs is adapted to contain more than about 100 nanoliters of fluid.

14. The method of claim 13, wherein at least one of the reservoirs is adapted to contain more than about 10 nanoliters of fluid.

15. The method of claim 13, wherein the reservoirs are adapted to contain more than 100 nanoliters of fluid.

16. The method of claim 14, wherein the reservoirs are adapted to contain more than about 100 nanoliters of fluid.

17. The method of claim 16, wherein each of the ejected droplets has a volume of about 1 pL or less.

18. The method of claim 17, wherein each of the ejected droplets has a volume in the range of about 0.025 pL to about 1 pL.

19. A method for preparing a peptide array comprised of a plurality of peptidic molecules attached to a substrate surface, the method comprising:
   (a) acoustically coupling a first reservoir containing a first peptidic molecule in a first fluid to an ejector that produces acoustic radiation;
   (b) activating the ejector to generate acoustic radiation having a focal point sufficiently near the surface of the first fluid so as to eject a droplet thereof toward a first site on the substrate surface;
   (c) acoustically coupling a second reservoir containing a second peptidic molecule in a second fluid to the ejector;
   (d) activating the ejector as in step (b) to eject a droplet of the second fluid from the second reservoir toward a second site on the substrate surface; and
   (e) repeating steps (c) and (d) with additional reservoirs each containing a peptidic molecule in a fluid until a droplet has been ejected from each reservoir;
   wherein the peptidic molecules are selected from the group consisting of pharmacologically active peptides, polypeptides, and proteins.

20. The method of claim 19, wherein the time period between activation steps is no longer than about 1 second.

21. The method of claim 20, wherein the time period between activation steps is no longer than about 0.1 second.

22. The method of claim 21, wherein the time period between activation steps is no longer than about 0.01 second.

23. The method of claim 22, wherein the time period between activation steps is no longer than about 0.001 second.

24. The method of claim 19, wherein steps (b) and (d) result in attachment of the first and second peptidic molecules, respectively, to the first and second sites on the substrate surface.

25. The method of claim 24, wherein the attachment is covalent.

26. The method of claim 24, wherein the attachment is noncovalent.

27. The method of claim 19, wherein each peptidic molecule is comprised of about 5 to about 10,000 amino acids.

28. The method of claim 27, wherein each peptidic molecule is comprised of about 5 to about 1,000 amino acids.

29. The method of claim 19, wherein each peptidic molecule is an oligopeptide, a polypeptide or protein.

30. The method of claim 29, wherein each peptidic molecule is selected from the group consisting of enzymes, antibodies, antigens, coagulation modulators, cytokines, endorphins, peptidyl hormones and kinins.

31. The method of claim 30, wherein each peptidic molecule is different.

32. The method of either claim 1 or claim 19, wherein the substrate surface is activated as a result of pretreatment with an activating agent.

33. The method of claim 32, wherein the activating agent is cyanogen bromide, tresyl chloride or N-hydroxysuccinimide.

34. The method of either claim 1 or claim 19, wherein the substrate surface is comprised of a porous material.

35. The method of claim 34, wherein the porous material is a permeable material.

* * * * *